United States Patent [19]
Park et al.

[11] Patent Number: 5,701,054
[45] Date of Patent: Dec. 23, 1997

[54] MIXED GREEN-EMITTING PHOSPHOR AND A CATHODE RAY TUBE ADOPTING THE SAME

[75] Inventors: Chang-won Park; Jun-mo Yang, both of Suwon; Joon-bae Lee, Seoul, all of Rep. of Korea

[73] Assignee: Samsung Display Devices Co., Ltd., Kyungki-do, Rep. of Korea

[21] Appl. No.: 417,837

[22] Filed: Apr. 6, 1995

[30] Foreign Application Priority Data

Oct. 12, 1994 [KR] Rep. of Korea ............... 94-26118

[51] Int. Cl.$^6$ ............................................. H01J 29/20
[52] U.S. Cl. ................................. 313/467; 313/486
[58] Field of Search ............................. 313/485, 486, 313/487, 468

[56] References Cited

U.S. PATENT DOCUMENTS

| | | | |
|---|---|---|---|
| 4,309,481 | 1/1982 | Wakatsuki et al. | 313/468 |
| 4,924,139 | 5/1990 | Morita et al. | 313/468 |

*Primary Examiner*—Sandra L. O'Shea
*Assistant Examiner*—Vip Patel
*Attorney, Agent, or Firm*—Leydig, Voit & Mayer, Ltd.

[57] ABSTRACT

A mixed green-emitting phosphorus manufactured by mixing $InBO_3$:Tb and one selected from ZnS:Cu,Au,Al and ZnS:Cu,Al, optionally with $Zn_2SiO_4$:Mn. A cathode ray tube adopting the mixed green-emitting phosphor not only has good luminance and color purity, but also enhanced afterglow and luminosity characteristics.

4 Claims, No Drawings

MIXED GREEN-EMITTING PHOSPHOR AND A CATHODE RAY TUBE ADOPTING THE SAME

BACKGROUND OF THE INVENTION

The present invention relates to a mixed green-emitting phosphor and a cathode ray tube (CRT) adopting the same, and more particularly, to a mixed green-emitting phosphor for enhancing afterglow characteristic and diminishing flicker and a CRT adopting the same.

In recent times, the prevalence of CRT display devices has been rapidly increasing and such devices have a close relation with our daily life. In many cases, this widespread usage is adversely affecting human eyes, and particularly, operators may suffer VDT (video display terminal) syndrome which is a sort of occupational disease caused by the extensive viewing of the display of a cathode ray tube. VDT syndrome is an impaired functioning of the eyes, which is caused by flicker, electromagnetic waves, and other properties of a CRT.

Accordingly, a great deal of research has gone into diminishing flicker as a way for preventing VDT syndrome. The result of the research shows that the flicker is affected by such factors as display size, scanning mode, afterglow and phosphor luminance. Therefore, methods for diminishing flicker through control of these factors can be used.

Among the methods to prevent flicker, much research has concentrated on controlling the refresh rate and enhancing the afterglow characteristic. The present application relates to a method for improving the afterglow characteristic of the phosphor.

As components of the conventional phosphor of a color cathode ray tube, yttrium oxy-sulfide activated with europium ($Y_2O_2S$:Eu) as a red-emitting phosphor, zinc sulfide activated with copper and gold and co-activated with aluminum (ZnS:Cu,Au,Al), zinc sulfide activated with copper and co-activated with aluminum (ZnS:Cu,Al) as a mixed green-emitting phosphor, and zinc sulfide activated with silver and co-activated with chlorine (ZnS:Ag,Cl) as a blue-emitting phosphor have come into wide use. However, these phosphors are components having a short afterglow characteristic which gives rise to flicker. Accordingly, the need for a phosphor having good afterglow characteristic has been increasing.

Particularly, among red, green and blue-emitting phosphors, a great deal of research was concentrated on obtaining a green-emitting phosphor having a long afterglow characteristic. Because a green-emitting phosphor exerts influence above 60% on screen luminance, and thus it is easy to improve afterglow characteristic all over the screen by improving the afterglow characteristic thereof.

ZnS:Cu,Au,Al and ZnS:Cu,Al have come into use as a conventional mixed green-emitting phosphor, but both have a short afterglow characteristic; that is, a decay time of about 0.45 ms. To the contrary, indium borate activated with terbium ($InBO_3$:Tb) and zinc silicate activated with manganese ($Zn_2SiO_4$:Mn) are known as phosphors having long afterglow and good color purity. However, these phosphors are costly, exhibit poor luminance, and since an "afterimage" is caused owing to an overly long afterglow time, their practical use is somewhat restricted.

SUMMARY OF THE INVENTION

The object of the present invention is to provide a mixed green-emitting phosphor having good afterglow characteristic for diminishing flicker.

It is another object of the present invention to provide a cathode ray tube adopting the mixed green-emitting phosphor of the present invention, for diminishing flicker and thus reducing eye-fatigue.

To accomplish the above object, there is provided according to the present invention, a mixed green-emitting phosphor comprising $InBO_3$:Tb and one selected from ZnS:Cu, Au,Al and ZnS:Cu,Al.

To accomplish the above another object, there is provided according to the present invention, a cathode ray tube adopting the mixed green-emitting phosphors comprising $InBO_3$:Tb and one selected from ZnS:Cu,Au,Al and ZnS:Cu,Al.

Preferably, the mixed green-emitting phosphor further comprises $Zn_2SiO_4$:Mn.

Particularly, the amount of each mixed green-emitting phosphor according to the present invention is preferred to be 40~90 wt % of $InBO_3$:Tb, with the balance being ZnS:Cu,Au,Al or ZnS:Cu,Al. In the case of further comprising $Zn_2SiO_4$:Mn, the amount of each mixed green-emitting phosphor is preferred to be 40~80 wt % of $InBO_3$:Tb and 10~30 wt % of $Zn_2SiO_4$:Mn, with the balance being ZnS:Cu,Au,Al or ZnS:Cu,Al.

DETAILED DESCRIPTION OF THE INVENTION

A mixed green-emitting phosphor of the present invention is manufactured by mixing ZnS:Cu,Au,Al or ZnS:Cu,Al having high luminance and $InBO_3$:Tb having a very long afterglow time and rather good color purity so as to improve the afterglow characteristic. The mixed green-emitting phosphor according to the present invention may also contain $Zn_2SiO_4$:Mn which exhibits excellent color purity and long afterglow time.

While the $InBO_3$:Tb is difficult to put to practical use due to poor luminance thereof, it has a rather good color purity characteristic (X=0.330, Y=0.592), a long afterglow time, and excellent luminosity. While $Zn_2SiO_4$:Mn has luminance poorer than $InBO_3$:Tb, the $Zn_2SiO_4$:Mn has a very long afterglow time and X-Y chromaticity coordinates (0.210, 0.700) nearly adjacent to coordinates (0.210, 0.710) initially determined by the National Television System Committee; that is, nearly ideal color purity.

In view of the aforementioned characteristics, a mixed green-emitting phosphor manufactured by suitably mixing $InBO_3$:Tb with one selected from ZnS:Cu,Au,Al and ZnS:Cu,Al maintains luminance and color purity within a level suitable to practical use. Also, the mixed green-emitting phosphor not only improves luminosity characteristics, but also can lengthen afterglow time to diminish flicker, compared with only one green-emitting phosphor selected from ZnS:Cu,Au,Al and ZnS:Cu,Al without $InBO_3$:Tb. Additionally, the green-emitting phosphor of the present invention can also contain $Zn_2SiO_4$:Mn which exhibits excellent color purity and long afterglow time.

Particularly, the mixing ratio of each phosphor is preferred to be 40~90 wt % of $InBO_3$:Tb, with the balance being ZnS:Cu,Au,Al or ZnS:Cu,Al. In case of further comprising $Zn_2SiO_4$:Mn, 40~80 wt % of $InBO_3$:Tb and 10~30 wt % of $Zn_2SiO_4$:Mn, with the balance being ZnS:Cu,Au,Al or ZnS:Cu,Al, based upon the total weight of the mixed green-emitting phosphor. Here, if the amount of $InBO_3$:Tb or $Zn_2SiO_4$:Mn is less than the determined range, the afterglow characteristic-enhancing effect is slight, and if more than the determined range, the adverse effect to luminance characteristic is predominant, thereby impeding its practical use.

Each phosphor used to manufacture the mixed green-emitting phosphor of the present invention is prepared as follows:

1) Preparation of ZnS:Cu,Au,Al 0.048 g of copper sulfate ($CuSO_4 \cdot 5H_2O$) as a Cu activator component, 0.212 g of chloroauric acid ($HAuCl_4 \cdot 4H_2O$) as an Au activator component, 0.2 g of aluminum fluoride ($AlF_3$) as a Al co-activator component, and 0.6 g of ammonium iodide ($NH_4I$) as a flux were added to pure water. The thus-obtained solution was added to 100 g of ZnS and homogeneously mixed. Thereafter, the mixture was fired at 1000° C. for two hours in a thermostable container under a reducing atmosphere with sulphur, followed by washing and drying, to obtain the ZnS:Cu,Au,Al.

2) Preparation of ZnS:Cu,Al

The above-mentioned ZnS:Cu,Al was prepared in the same manner as described in the above 1) for the ZnS:Cu, Au,Al but without adding chloroauric acid ($HAuCl_4 \cdot 4H_2O$) as an Au activator component.

3) Preparation of $InBO_3$:Tb 3.3 g of indium oxide ($In_2O_3$) and 1.5 g of boric acid ($H_3BO_3$) as starting materials of $InBO_3$, 0.121 g of terbium oxide ($Tb_4O_7$) as a Tb activator component and lithium tetraborate ($Li_2B_4O_7$) as a flux were homogeneously mixed and then fired at 1300° for three hours in a thermostable container, followed by washing and drying, to obtain $InBO_3$:Tb.

4) Preparation of $Zn_2SiO_4$:Mn 4 g of zinc oxide (ZnO), 6 g of silicon dioxide ($SiO_2$) and 0.2 g of manganese sulfate ($MnSO_4$) were homogeneously mixed and then fired at 1200° C. for two hours, followed by washing and drying, to obtain the $Zn_2SiO_4$:Mn.

Hereinbelow, the present invention is described more concretely with reference to specific examples intended to illustrate the instant invention without limiting the scope thereof.

EXAMPLE 1

The mixed green-emitting phosphor according to the present invention was prepared by mixing 30 wt % of ZnS:Cu,Al and 70 wt % of $InBO_3$. A screen was manufactured using only the thus-obtained phosphor and then luminance of the screen was estimated.

The screen for color cathode ray tube was manufactured using the thus-obtained mixed green-emitting phosphor, $Y_2O_2S$:Eu as a red-emitting phosphor and ZnS:Ag,Cl as a blue-emitting phosphor. Then luminance, chromaticity coordinates, afterglow time and luminosity of the screen were estimated and the result described in the following Table 1.

As shown in Table 1, the phosphor layer of a cathode ray tube manufactured by using the mixed green-emitting phosphor of the present invention has rather good luminance as well as a color purity characteristic (X=0.305 and Y=0.594), near that of the European Broadcasting Union Standard (X=0.290, Y=0.600) which is widely followed as the new standard with respect to chromaticity coordinates. Therefore, the thus-manufactured phosphor layer can be put to practical use. Additionally, it has an afterglow time twenty times that of the phosphor layer using only ZnS:Cu,Al, to thereby diminish flicker drastically, and it exhibits a good luminosity characteristic.

EXAMPLES 2-7

As shown in Table 1, the mixed green-emitting phosphor was prepared by varying the mixing ratio of each green-emitting phosphor within the range of the present invention. A screen was manufactured using only the thus-obtained phosphor and then luminance of the screen was estimated.

The screen for the color cathode ray tube was manufactured using the thus-obtained mixed green-emitting phosphor, $Y_2O_2S$:Eu as a red-emitting phosphor and ZnS:Ag,Cl as a blue-emitting phosphor. Then luminance, chromaticity coordinates, afterglow time and luminosity of the screen were estimated and the result is shown in the following Table 1.

As shown in Table 1, the above-obtained phosphor maintains luminance and color purity within a level suitable to practical use. Also, the above-obtained phosphor not only improves the luminosity characteristic, but also can lengthen the afterglow time to diminish flicker, compared with only one green-emitting phosphor selected from ZnS:Cu,Au,Al and ZnS:Cu,Al without $InBO_3$:Tb.

COMPARATIVE EXAMPLES 1-4

A screen for a cathode ray tube was prepared in the same manner as described in Example 1 except that a single phosphor alone was used as a green-emitting phosphor component. And each characteristic was estimated and the result is shown in the following Table 1. As shown in Table 1, since one or more of the thus-estimated characteristics were extremely poor, its practical use is impeded.

Here, in the case of using ZnS:Cu,Al or ZnS:Cu,Au,Al alone, the screen exhibits good luminance but has a very short afterglow time (the major cause of flicker) and has a poor luminosity characteristic.

In the case of using $InBO_3$ or $Zn_2SiO_4$ alone, the luminosity characteristic is excellent. However, since the afterglow time is very long and luminance is not good, its practical use is impeded.

As mentioned above, the mixed green-emitting phosphor according to the present invention is manufactured by mixing $InBO_3$:Tb with one phsophor selected from ZnS:Cu,Au, Al and ZnS:Cu,Al, optionally with $Zn_2SiO_4$:Mn in a predetermined ratio. Accordingly, the mixed green-emitting phosphor according to the present invention not only has good luminance and color purity but also enhanced afterglow and luminosity characteristics.

TABLE 1

| | phosphor mixing ratio | | | | luminance (%) | | chromaticity cooridinates | | decay time | |
|---|---|---|---|---|---|---|---|---|---|---|
| Ex. | ZnS:Cu,Au,Al | ZnS:Cu,Al | $InBO_3$:Tb | $Zn_2SiO_4$ | A | B | X | Y | (ms) | luminosity |
| 1 | | 30 | 70 | | 82 | 93 | 0.305 | 0.594 | 9.4 | good |
| 2 | | 20 | 80 | | 78 | 90 | 0.314 | 0.593 | 11 | good |

TABLE 1-continued

| Ex. | phosphor mixing ratio | | | | luminance (%) | | chromaticity cooridinates | | decay time | |
|---|---|---|---|---|---|---|---|---|---|---|
| | ZnS:Cu,Au,Al | ZnS:Cu,Al | InBO$_3$:Tb | Zn$_2$SiO$_4$ | A | B | X | Y | (ms) | luminosity |
| 3 | | 30 | 40 | 30 | 77 | 92 | 0.281 | 0.606 | 10 | good |
| 4 | | 10 | 80 | 10 | 70 | 85 | 0.297 | 0.610 | 12 | good |
| 5 | | 50 | 50 | | 93 | 97 | 0.290 | 0.601 | 3 | normal |
| 6 | | 40 | 60 | | 87 | 95 | 0.299 | 0.598 | 4 | normal |
| 7 | 40 | | 10 | 50 | 82 | 90 | 0.265 | 0.623 | 4.2 | normal |
| comp. 1 | 100 | | | | 100 | 100 | 0.299 | 0.587 | 0.45 | poor |
| comp. 2 | | 100 | | | 105 | 101 | 0.270 | 0.610 | 0.45 | poor |
| comp. 3 | | | 100 | | 63 | 75 | 0.330 | 0.592 | 32 | excellent |
| comp. 4 | | | | 100 | 60 | 70 | 0.210 | 0.700 | 32 | excellent | luminance
A: screen manufactured using green-emitting phosphor alone
B: screen manufactured using all phosphors
conditions: 25kV, 500 μA(greep light), 25kV, 400 μA(white light)
tube: 14", 0.28 dot
decay time: time to decay to 1/50th of initial luminance

What is claimed is:

1. A green-emitting phosphor comprising a mixture of InBO$_3$:Tb and a phosphor selected from the group consisting of ZnS:Cu,Au,Al and ZnS:Cu,Al, wherein the amount of said InBO$_3$:Tb is about 50–90 wt % of the total weight of said green-emitting phosphor.

2. A green-emitting phosphor comprising a mixture of InBO$_3$:Tb, Zn$_2$SiO$_4$:Mn and a phosphor selected from the group consisting of ZnS:Cu,Au,Al, wherein the amounts of said InBO$_3$:Tb and said Zn$_2$SiO$_4$:Mn are about 50–80 wt % and about 10–30 wt %, respectively, of the total weight of said green-emitting phosphor.

3. A cathode ray tube including a green-emitting phosphor which comprises a mixture of InBO$_3$:Tb and a phosphor selected from the group consisting of ZnS:Cu,Au,Al and ZnS:Cu,Al, the amount of said InBO$_3$:Tb being about 50–90 wt % of the total weight of said green-emitting phosphor.

4. A cathode ray tube including a green-emitting phosphor which comprises a mixture of InBO$_3$:Tb, Zn$_2$SiO$_4$ and a phosphor selected from the group consisting of ZnS:Cu,Au, Al and ZnS:Cu,Al, the amount of said InBO$_3$:Tb and said Zn$_2$SiO$_4$ being about 50–80 wt % and about 10–30 wt %, respectively, of the total weight of said green-emitting phosphor.

* * * * *